United States Patent
Gelsomino

(10) Patent No.: US 7,054,748 B2
(45) Date of Patent: May 30, 2006

(54) VIBRATION MONITORING DEVICE AND SYSTEM

(76) Inventor: Joseph Gelsomino, One Turnbridge Walke, East Aurora, NY (US) 14052

(\*) Notice: Subject to any disclaimer, the term of this patent is extended or adjusted under 35 U.S.C. 154(b) by 0 days.

(21) Appl. No.: 10/705,111

(22) Filed: Nov. 11, 2003

(65) Prior Publication Data

US 2004/0122604 A1    Jun. 24, 2004

Related U.S. Application Data

(60) Provisional application No. 60/425,447, filed on Nov. 12, 2002.

(51) Int. Cl.
*G01V 1/40* (2006.01)
(52) U.S. Cl. .......................... 702/6; 701/100
(58) Field of Classification Search ............... 702/56, 702/35, 1–6, 33, 57; 73/660, 579, 659, 769, 73/35, 56; 340/990, 995
See application file for complete search history.

(56) References Cited

U.S. PATENT DOCUMENTS

| | | | | | |
|---|---|---|---|---|---|
| 4,480,480 | A | * | 11/1984 | Scott et al. ................... | 73/769 |
| 5,679,900 | A | * | 10/1997 | Smulders ..................... | 73/659 |
| 6,289,735 | B1 | * | 9/2001 | Dister et al. .................. | 73/579 |
| 6,526,831 | B1 | * | 3/2003 | Ben-Romdhane ............ | 73/660 |
| 2002/0083773 | A1 | * | 7/2002 | Ben-Romdhane ............ | 73/660 |

\* cited by examiner

*Primary Examiner*—Michael Nghiem
*Assistant Examiner*—Victor J. Taylor

(57) ABSTRACT

The present invention is a portable vibration monitoring device and system for evaluating the degradation of rotating components, the monitoring device being a portable electronic system which receives vibration and varying speed rotational data from one or more rotating components, converts the data to usable digital data, compares the sensed data to a pre-programmed normal model and provides a visual display of the stability characteristics of the rotating device to the operator for use in timely determining appropriate repairs.

16 Claims, 1 Drawing Sheet

VIBRATION MONITORING DEVICE AND SYSTEM

This application claims the benefit of Provisional application Ser. No. 60/425,447, filed Nov. 12, 2002.

The present invention relates to a vibration monitoring device and system, which is particularly suitable for use with water going vessels having one or more rotating components which rotate at variable rotational speeds.

BACKGROUND OF THE INVENTION

Machines of all types and nature comprise components that rotate at varying speeds and which may vibrate with different amounts of vibration at different rotational speeds. An acceptable amount of component vibration at one speed of rotation, may not be acceptable at other speeds of rotation, while changes in conditions of use and the stability of the machine containing the rotating component add further variation to vibration amounts. There is therefore a continuing need for means for assessing and evaluating vibration with changes in speed of rotation and particularly assessing and evaluating changes in vibration as they might occur under changing conditions subjected upon the rotating component and the machine containing same during use.

Vibrations experienced from rotating components in stationary mounted machinery in a non-moving environment are generally easiest to measure and evaluate, the rotating components being retained under controlled conditions. Machinery contained in moving vehicles adds a level of difficult in ascertaining accurate measurement and evaluation of the rotating components particularly depending upon the environment within which the moving vehicle may be moving.

Vibrations associated with water craft, particularly vibrations in the motorized power train of small and medium sized water craft, are particularly difficult to accurately measure and assess, due to the continuing changing surface of water on which the vessel is traveling, and the interference occasioned by the inconsistent movement of the hull and power train in response to inconsistent wave action during the vessel's travel through water. Thus vibrations which might foretell a potentially serious problem, may be felt only sporadically by a boat operator and in association with particular weather or wave impact and are easily dismissed as environmentally associated, as distinct from potential equipment failure, until failure of the device occurs.

Vibration in a water craft generally starts as a barely distinguishable hum at various vessel speeds and in many instances is perceived by the operator as a comforting sound confirming efficient operation of the vessel at those speeds. Frequently, the hum is not accompanied by a noticeable sense of vibration, particularly when the vessel is crashing through waves so the hull is flexing with the movement of the vessel and the operator is braced to absorb the motion and pounding of movement through the water. If the operator does become uncomfortable with the hum he generally doesn't associate it with equipment failure, but merely accepts same as a characteristic of the speed at which the boat is traveling and generally merely adjusts his speed to avoid the continuation thereof. By the time the hum becomes associated with a problem, the damage has already been done and the small problem which could have been conveniently and inexpensively repaired, becomes a major problem.

Various vibration monitoring means are known in the art, and the effect of changes in vibration of rotating components is a well recognized method of identifying problems associated with rotating component wear before it reaches a critical stage. The significant cost, lack of portability and general necessity that vibration monitoring means of the prior art be operated by highly skilled operators, has generally limited the use of available monitoring devices to periodic checks of large commercial vessels by skilled vibration monitoring services, thus deterring their use in small and medium sized recreational vessels.

In the past, vibration monitoring of water craft has been limited to periodic monitoring services by uniquely skilled personnel who sample vibration data at various fixed rotational speeds while the vessel is either at rest in the water or under very controlled water conditions to establish a base vibration data point. Periodically the sampling is repeated under the same conditions at the same fixed rotational speeds at later times after wear is expected or an increase of vibration has been noticed by the operator of the craft. Each time the operation is undertaken, sophisticated monitors are brought into the vessel and attachments are made to the appropriate stuffing boxes, struts or bearing housings the entire process taking significant time which converts to cost and down time of the vessel.

An object of the present invention is to provide a portable vibration monitoring means and system which can be conveniently installed in a water vessel and operated by a generally non-skilled operator which automatically assess and evaluate discrete vibration sources in the power train of a small water vessel at varying speeds of rotation thereof, and provide continuous status information to the operator.

SUMMARY OF THE INVENTION

The present invention comprises a system for monitoring the rotational stability of one or more rotating components in a water craft, generally comprising a cockpit mountable water resistant vibration monitoring device, vibration sensor means, means for transmitting data from said vibration sensor to said vibration monitoring unit, rotation sensing means, means for transmitting data from said rotation sensing means to said vibration monitoring unit, and display means which displays the extent of vibrations sensed in relationship to the speed of rotation of the component compared to normal, providing a base indication of degradation of rotational stability.

The vibration monitoring unit generally comprises controller means, converter means, display means, alarm means and data storage means. Data which has been provided by vibration sensors and rotational speed sensors is input as digital data to the controller means, which is programmed to compute and compare the data to programmed and otherwise stored model data and/or stored historic data. The compared and computed data is analyzed and provided as an audio and/or video display to the operator of the vessel, of status of vibrations sensed by one or more sensor(s) at the various sensed rotational speeds.

Signal information can be transmitted by a sensor to the vibration monitoring unit by any convenient method, such as by hard wire, radio signal transmission or the like. Generally, hard wired transmission is preferred, but in an alternate embodiment, a sensor comprises a radio transmission means which transmits a radio signal to a remote receiver which amplifies, distinguishes and/or converts all or portions of the signal to usable data which is provided to the vibration monitoring unit.

Usable data obtained from a signal received from a sensor is generally compared by a comparitor means to previously stored data in the data storage means. A computing means generally analyses, computes and confirms vibration variations from a defined normal at a defined speed of rotation. A display means displays visual confirmation, to the operator, of the status and analysis of vibrations sensed by the sensor at the rotational speed(s). Alarm means are generally incorporated into the monitoring unit which provides an audio and/or video warning to the operator of a particularly problematic vibration and/or equipment failure. The data storage means generally stores information received by the monitoring unit for historic reference and comparison.

Generally the vibration monitoring unit is mounted at a convenient viewing position in the cockpit or other centralized control location in the vessel for the operator of the vessel to visually or audibly observe. One or more vibration sensors are permanently installed on the stuffing box, bearing supports, struts or the like of the vessel to provide continuous vibration data signals to the unit. One or more rotational sensors are arranged to sense the rotational speed of the desired component.

The monitoring unit generally receives vibration and rotational speed data from the sensors located at one or more critical monitoring points of one or more rotational components being monitored, and stores pertinent vibration data collected through multiple differential speeds of rotation of the rotating component and compares such vibrational data at the various differential speeds to pre-established vibration parameters. The comparison of vibrational data to pre-established parameters at differing rotational speeds continues as long as the monitoring system is activated and generally is arranged so that it is activated as normal operating instrumentation along with common instrumentation found on a typical vessel. The monitoring unit generally comprises a visual display which can be conveniently viewed by the vessel operator for quick visual identification of a common and/or uncommon vibration and further comprises alarms which may visually and/or audibly warn the vessel operator of problematic vibrations.

Generally, the vibration sensors are piezoelectric or capacitive accelerometers, which are permanently mounted to convenient struts, bearing housings, stuffing boxes or the like to generate various electrical signals which change upon variations in vibration. The speed of rotation of the rotating component is generally separately measured by tachometer sensing means or the like which sends signals to the measurement and display unit coincident with the vibration signals being sent by the vibration sensors. The signals are generally transmitted by hard wiring to the measurement and display unit and the sensors may be powered to amplify the signal generated thereby. The micro-controller is generally housed in a water-resistant plastic case suitable for mounting on a boat's cockpit console or the like convenient to the vessel operator. The measurement and display unit has a display generally comprising an LCD for communicating information from the micro-controller to a user, and input keys that permit a user to communicate with the micro-controller. The unit generally also has an LED for quick visual reference of the user as to whether acceptable vibration limits are exceeded, or are about to be exceeded. In a preferred embodiment the unit contains an audible signal generator for warning when acceptable vibration limits are exceeded or are about to be exceeded.

Signals from the accelerometers and from the tachometer(s) are sent to the vibration monitoring unit. The unit generally provides power to the accelerometer to amplify the signal and then accepts the sensor's analog signal. Analog to digital converters are generally contained in the unit which convert the analog signal received from an accelerometer into a digital signal while performing an integration of the signal into a velocity (in/s) measurement value.

The controller generally samples the measured vibration values over a predetermined sample time interval and calculates a root-mean-square (RMS) vibration value for the predetermined sample time interval. The micro-controller generally determines an acceptable vibration limit from a plurality of such vibration limits by comparing the system RPM to a plurality of possible RPMs stored therein. The micro-controller selects the acceptable vibration limit corresponding to the system RPM. Once the acceptable vibration limit is selected, the micro-controller compares the acceptable vibration limit to the measured vibration value. The comparison may be done by dividing the measured vibration value into the acceptable vibration limit to provide a percent-of-vibration-limit (PVL) value. The PVL can then be displayed on a monitor screen or LED array as a bar graph or the like or the RMS vibration value can be displayed numerically.

The unit may comprise a multi-colored LED or the like, preferably green, yellow, and red to display operating conditions. If the PVL value is within a first range, a green portion of the LED may be illuminated to indicate that the PVL is in a normal range. If the PVL value is within a second range, a yellow portion of the LED may be illuminated to indicate that the PVL is in a warning range and/or a first audible alarm may be sounded. If the PVL value is within a third range, a red portion of the LED may be illuminated to indicate a danger range and a further audible alarm may be sounded. Time delays, which may or may not be user adjustable may be incorporated for an LED array and/or audible alarm.

A plurality of dynamic systems operating at varying speeds may be monitored in the manner described above. For each dynamic system, the unit will generally have one or more accelerometers and a tachometer signal source. It is generally preferred that a single unit would be used regardless of the number of dynamic systems involved.

The above features and advantages of the invention will become more apparent to those having skill in the art from the following written description and drawing.

Figure 1:
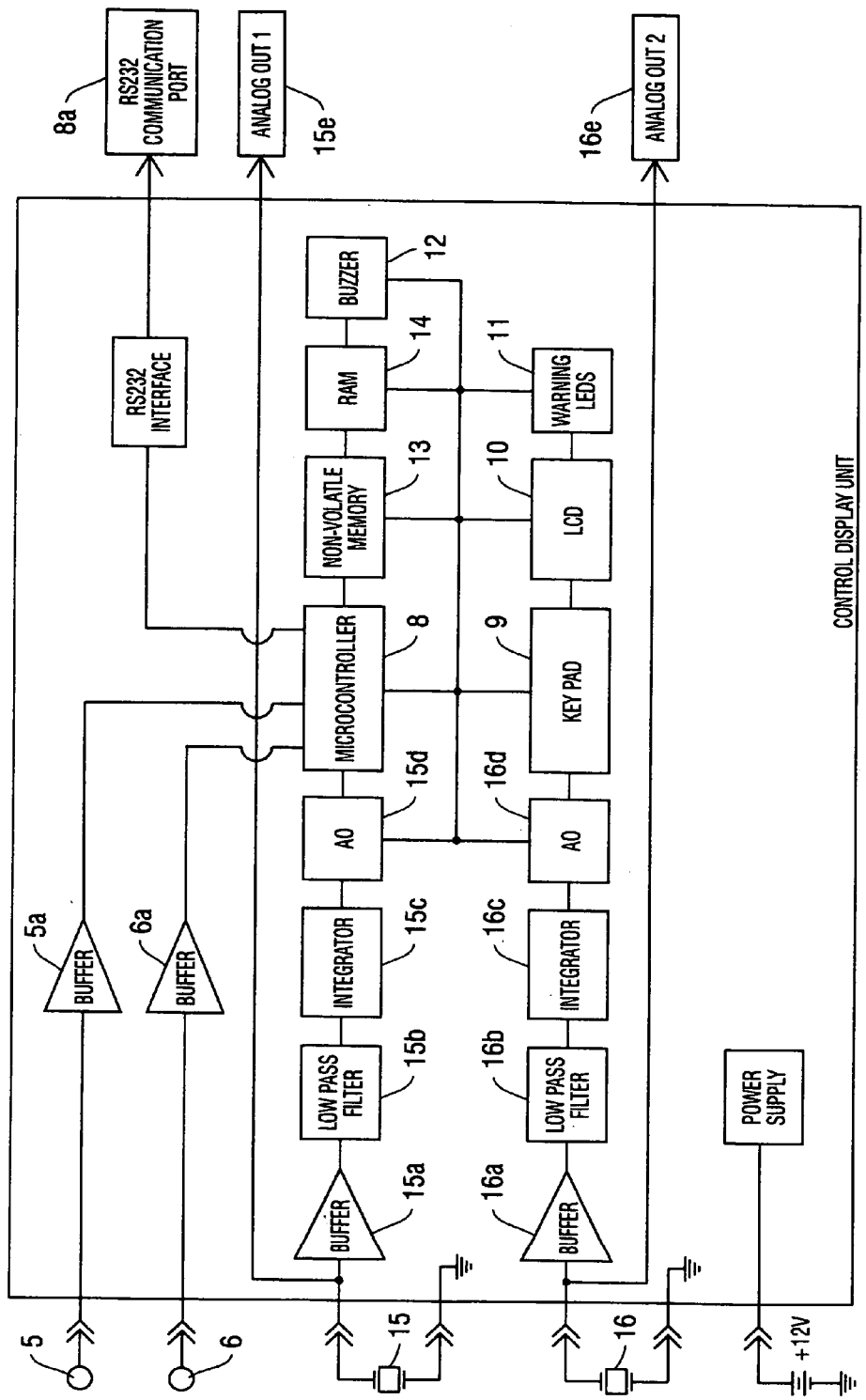
FIG. 1 comprises a general schematic of a system arranged to monitor two dynamic systems, comprising two different rotating components, each having a tachometer and accelerometer sending different signals to the unit, with the unit differentially comparing each signal and providing video and audio output for observation and warning to the user.

Therein, the rotational speed of a first discrete rotating shaft (not shown) of a device is sensed by a conventionally installed electronic tachometer 5, and the vibration of a controlling bearing supporting such first discrete rotating shaft is sensed by sensor 15 mounted at about said bearing. Signals generated by tachometer 5 are generally sent through a common buffer circuit 5a for input to micro-controller 8. Acceleration signals generated by sensor 15, are generally sent through a common buffer circuit 15a, signal filtering circuit 15b and integrator circuit 15c to analog/digital converter 15d. Integrator circuit 15c, changes the acceleration signal generated by sensor 15 and filtered by filter circuit 15b to a velocity signal for input to the analog/digital converter 15d. Port 15e is provided to enable further convenient access to data being generated by sensor 15 for use by other vibration sensing equipment. It should be understood that such port may also be arranged at various other points along the data stream before or after digitizing.

Similarly, the rotational speed of a second discrete rotating shaft (not shown) of a device is sensed by a conventionally installed electronic tachometer 6, and the vibration of a controlling bearing supporting such second discrete rotating shaft is sensed by sensor 16 mounted at about said bearing. Signals generated by tachometer 6 are sent through common buffer circuit 6a for input to micro-controller 8. Acceleration Signals generated by sensor 16, are sent through common buffer circuit 16a, signal filtering circuit 16b and integrator circuit 16c to analog/digital converter 16d. Similarly as noted above, port 16e is arranged to enable convenient access to data generated by sensor 16.

Micro-controller 8 generally operates to retain the multiple distinguished sensing circuits discrete and enable computing and comparison of sensor data, tachometer data, and data stored in non-volatile memory means 13, using random access memory 14. Keypad 9 is provided to enable operator data input to micro-controller 8, while port 8a is provided to allow re-programming or the like of the unit through micro-controller 8, as may be necessary. LCD 10 is provided to enable visual observation of a detailed calculated data stream by the operator, while LCD 11 and buzzer 12 provide an immediate or delayed, visible light and/or audio, warning of vibration detection. Delayed warning is generally dependent upon time and/or consistency of vibration detected.

Generally there are three operational modes applied to the system of the invention: set-up; calibration; and monitoring. Generally there are two calibration modes, manual and automatic. In manual calibration the user programs the RPM ranges and acceptable vibration levels using keypad 9. Automatic calibration can be used when acceptable vibrations limits are not known and established by the programming of the unit which is generally imposed through port 8a.

Generally, in the set-up mode, the user programs information the microprocessor will use in the monitoring mode and calibration mode. Information that is generally entered pertinent to calibration of the tachometer impulses to engine revolutions and/or reduction ratios of a transmission for example, to determine a shaft's RPM. Time delays for warning levels are entered as well as selections for manual or automatic calibration. Generally, if the automatic calibration mode is used, the upper and lower operational RPM are programmed to establish the various RPM ranges that will be utilized during calibration mode and monitoring mode.

In the manual mode of calibration the user can program the known acceptable vibration limits and corresponding RPM ranges. If the vibration limits are not known the user can utilize the automatic calibration mode. The Automatic Calibration is done while the machinery is running and establishes acceptable vibration levels, as a baseline that the unit utilizes in monitoring mode.

Generally in the automatic calibration procedure, the unit establishes the various RPM ranges based on the upper and lower RPMs entered during the set-up procedure, then prompts the user to operate the machine at a particular RPM, starting with the lower RPM that was entered during set up, and prompts the user to execute a key sequence so that the unit can capture the vibration signal and calculate the acceptable vibration for that RPM range. The unit then prompts the user to continue with this sequence until the upper RPM that was entered during set up is reached.

I claim:

1. A system for monitoring the rotational stability of a rotating component of a device mounted to a water craft, comprising:
   a vibration monitoring unit having controller means, converter means, display means and data storage means;
   vibration sensing means, arranged to transmit a signal comprising vibration data from said rotating component to said vibration monitoring unit;
   rotation sensing means, arranged to transmit a signal comprising rotation data from said rotating component to said vibration monitoring unit;
   wherein said vibration data transmitted to said vibration monitoring unit is converted to digital data, is input to said controller means and correlated to input of said rotation data from said rotation sensing means; and,
   said input vibration data and said input rotation data is analyzed and compared by said controller means to model data stored in said data storage means, and said display means is enabled to display data representing the rotational stability of said rotating component at variable rotational speeds.

2. The system of claim 1 wherein said vibration sensing means transmits a signal through hard-wire connection to said vibration monitoring unit.

3. The system of claim 1 wherein said vibration monitoring unit comprises visual alarm means arranged to provide a visual warning when the rotational stability of said rotating component degrades from a defined normal range.

4. The system of claim 3 wherein said alarm means comprises an LED warning light.

5. The system of claim 1 wherein said vibration monitoring unit comprises audio alarm means arranged to provide a warning sound when the rotational stability of said rotating component degrades from a defined normal range.

6. The system of claim 1 wherein said vibration monitoring unit comprises keypad means for operator entry of data relating to the computing and comparison of data by said controller means.

7. The system of claim 1 wherein said vibration monitoring unit comprises integrator means arranged to convert acceleration data to velocity data for computing by said controller means.

8. The system of claim 1 wherein said vibration signal is filtered prior to conversion of acceleration data to velocity data.

9. The system of claim 1 wherein said converter means converts analog data to digital data for input to said controller means.

10. The system of claim 1 comprising means for remotely programming said controller means.

11. A portable vibration monitoring device comprising:
a water resistant housing having controller means, converter means, display means, keypad data entry means, RAM memory and non-volatile data storage means;
said device comprising means for receiving a signal comprising analog vibration data from a vibration sensor and converting said analog data to usable digital data for input to said controller means, and means for receiving a signal comprising rotation data from a rotation sensor for input to said controller means;
wherein said controller means is programmed to compute and analyze said data received from said vibration and rotation sensors and compare such data to model program data stored in said data storage means, and cause the display of data at said display means, representing the rotational stability of said rotating component at variable rotational speeds as compared to said model program data.

12. The vibration monitoring device of claim 11 wherein the programming of said controller is responsive to data entered through said keypad data entry means.

13. The vibration monitoring device of claim 11 comprising means for programming said controller means from a remote device.

14. The vibration monitoring device of claim 11 an analog port for transmittal of said signal comprising analog vibration data to a remote controller means.

15. The vibration monitoring device of claim 11, comprising one of visual and audio alarm means arranged to provide a warning when the rotational stability of a rotating component degrades from a defined normal range.

16. The vibration monitoring device of claim 15, comprising delayed alarm activation means.

\* \* \* \* \*